United States Patent
Wang (10) Patent No.: US 9,191,317 B2
(45) Date of Patent: Nov. 17, 2015

(54) METHOD AND SYSTEM FOR IMPLEMENTING INTERCONNECTION BETWEEN INTERNET PROTOCOL VERSION 4 NETWORK AND NEW NETWORK

(75) Inventor: Jun Wang, Shenzhen (CN)

(73) Assignee: ZTE Corporation, Shenzhen City, Guangdong (CN)

(*) Notice: Subject to any disclaimer, the term of this patent is extended or adjusted under 35 U.S.C. 154(b) by 36 days.

(21) Appl. No.: 13/500,940

(22) PCT Filed: Dec. 24, 2009

(86) PCT No.: PCT/CN2009/075938
§ 371 (c)(1),
(2), (4) Date: Apr. 9, 2012

(87) PCT Pub. No.: WO2010/145164
PCT Pub. Date: Dec. 23, 2010

(65) Prior Publication Data
US 2012/0198025 A1    Aug. 2, 2012

(30) Foreign Application Priority Data
Oct. 10, 2009    (CN) .......................... 2009 1 0181129

(51) Int. Cl.
*G06F 15/16* (2006.01)
*H04L 12/56* (2006.01)
*H04L 29/12* (2006.01)

(52) U.S. Cl.
CPC .......... *H04L 45/741* (2013.01); *H04L 61/2076* (2013.01); *H04L 61/251* (2013.01); *H04L 61/2528* (2013.01); *H04L 61/1511* (2013.01); *H04L 61/2517* (2013.01); *H04L 61/2592* (2013.01)

(58) Field of Classification Search
USPC .......................................... 709/236, 245, 246
See application file for complete search history.

(56) References Cited

U.S. PATENT DOCUMENTS 6,118,784 A * 9/2000 Tsuchiya et al. .............. 370/401
2004/0141513 A1    7/2004 Takechi et al.
(Continued)

FOREIGN PATENT DOCUMENTS

CN    1691665 A    11/2005
CN    101316272 A    12/2008
(Continued)

OTHER PUBLICATIONS

Extended European Search Report for EP 098460785, Completed by the European Patent Office on Oct. 22, 2013, 8 Pages.
(Continued)

*Primary Examiner* — Vivek Srivastava
*Assistant Examiner* — Hermon Asres
(74) *Attorney, Agent, or Firm* — Brooks Kushman P.C.

(57) ABSTRACT

A method and system are provided for implementing intercommunication between an Internet Protocol Version 4 (IPV4) network and a new network. The new network adopts an addressing format different from that of the IPV4 network. The method includes an IPV4 network host sending a message to a new network host and a new network host sending a message to the IPV4 network host. The system includes an IPV4 network host, an intercommunication functional unit and a new network host. A method is also provided for implementing intercommunication between a first network and a second network.

19 Claims, 4 Drawing Sheets

(56) References Cited

U.S. PATENT DOCUMENTS

| | | | |
|---|---|---|---|
| 2006/0168267 A1* | 7/2006 | Fernandes et al. | 709/230 |
| 2007/0115942 A1* | 5/2007 | Money et al. | 370/352 |
| 2007/0183363 A1* | 8/2007 | Liden | 370/331 |
| 2008/0186203 A1* | 8/2008 | Vaswani et al. | 340/870.11 |
| 2011/0013647 A1 | 1/2011 | Park et al. | |

FOREIGN PATENT DOCUMENTS

| | | |
|---|---|---|
| JP | 2004221745 | 8/2004 |
| JP | 2007300522 A | 11/2007 |
| JP | 2008042881 | 2/2008 |
| KR | 100758971 | 9/2007 |
| KR | 20080050238 | 6/2008 |
| KR | 102080052856 A | 6/2008 |

OTHER PUBLICATIONS

Shin et al. Advanced Communication Technology 2004, The 6th International Conference on Phoenix Park, vol. 1, No. 9, p. 225-228, "Ports Option Support in Dual Stack Transition Mechanism (DSTM)."

Shin et al. ETRI Alain Durand Sun Microsystem Feb. 2001, 18 Pages, "Using a Single IPv4 Global Address in DSTM, <draft-shin-dstm-single-ipv-00.txt>."

Bound et al. Internet-Draft NGTRANS Working Group, Feb. 2002, vol. ngtrans, No. 7, 13 Pages, "Dual Stack Transition Mechanism (DSTM)."

Rattananon et al. Networks Sep. 28, 2003, The 11th IEEE International Conference, p. 211-216, "Extending REBEKAH-IP with Central Port Allocations for Un-Ambiguous IPv4 Address Expansion."

Japanese Office Action Dated Jan. 26, 2014, 2 Pages.

International Search Report for PCT/CN2009/075938, English translation attached to original, Both completed by the Chinese Patent Office on Jun. 9, 2010, All together 6 Pages.

Japanese Office Action for Japanese Patent Application No. 2012-532441, Dated Jun. 24, 2014, 3 Pages.

Domestic Technology Magazine 2009, pp. 70-73, Issued Date on Abstract is Jul. 1, 2014, English Abstract attached to Original Article, All together 5 Pages. "Manually set the server address, Note the default routing lengthiness."

* cited by examiner

METHOD AND SYSTEM FOR IMPLEMENTING INTERCONNECTION BETWEEN INTERNET PROTOCOL VERSION 4 NETWORK AND NEW NETWORK

CROSS-REFERENCE TO RELATED APPLICATION

This application is the U.S. national phase of PCT Appln. No. PCT/CN2009/075938 filed Dec. 24, 2009 which claims priority to Chinese Application No. 200910181129.6 filed on Oct. 10, 2009, the disclosures of which are incorporated in their entirety by reference herein.

TECHNICAL FIELD

The present invention relates to the field of communication, and in particular, to a method and system for implementing intercommunication between an IPV4 (Internet Protocol Version 4) network and a new network, and a method for intercommunication between networks with different addressing formats.

BACKGROUND ART

At present the IPV4 public network addresses are almost exhausted, and it is predicted in the industry that they will be completely exhausted in a few years, so migration to IPV6 is inevitable. During the process of migration to the IPV6, it is crucial to ensure the intercommunication between the host and network of the IPV4 and those of the IPV6. Currently, the addressing modes of NAT (Network Address Translation) and 6 to 4 are generally adopted in the industry to solve the intercommunication between IPV4 host and IPV6 host. According to this method, address format translation is implemented depending on a gateway device between the two networks, each IPV4 address needs to be mapped to a unique IPV6 address, the IANA (Internet Assigned Numbers Authority) specially distributes an IPV6 address prefix 2002:0000::/16 to indicate that the 32 bit thereafter is an IPV4 address, and the source address and destination address of a message sent from the IPV4 network to the IPV6 network, after being added with the IPV6 prefix at the gateway, is then sent to the IPV6 network, while the prefix is deleted from the reverse message at the gateway.

The problem of the method is that the IPV6 host participating in intercommunication also must occupy an IPV4 public network address and always occupies the address during the whole process of migration from the IPV4 to the IPV6, this migration process seems to be very long at present, and since the IPV4 address space is rather rare, the number of addresses required in this intercommunication scheme cannot be supported.

In addition, this intercommunication problem does not only lie between the IPV4 and IPV6 networks, but also lie in the intercommunication between a network with novel addressing provided by IETF (Internet Engineering Task Force) and the IPV4, for example, the representatives of identity/location separation technology, LISP (Locator/Identifier Separation Protocol) and HIP (Host Identity Protocol), both define a new identifier format, which will also be regarded as an IP address with a new format by the network and host of the IPV4 when the network with novel addressing communicates with the IPV4 network, so the new network has the same problem in intercommunication with the IPV4 network as the IPV6 network.

Another problem of intercommunication lies in the support of traditional applications for a new IP (Internet Protocol) address format. During the process of migration to a new IP network, network upgrading, host operation system/protocol stack upgrading are relatively easy, but applications can hardly be synchronous with the network upgrading due to their diversity, so compatibility with the old applications is also one of the crucial problems in the period of network transition.

SUMMARY OF THE INVENTION

The technical problem to be solved in the present invention is to provide a method and system for implementing intercommunication between networks with different addressing formats, and to achieve network intercommunication and application compatibility by way of address multiplexing.

In order to solve the above technical problem, the present invention provides a method for implementing intercommunication between an Internet Protocol Version 4 (IPV4) network and a new network, wherein, the new network adopts an addressing format different from that of the IPV4 network, and the method comprises:

an IPV4 network host sending a message to a new network host, wherein, the step of the IPV4 network host sending a message to the new network host comprises:

A1, the IPV4 network host sending a first intercommunication message, wherein, a source address of the first intercommunication message is an IPV4 address of the IPV4 network host, and a destination address of the first intercommunication message is a compatible format address of the new network host, and the compatible format address comprises an IPV4 format address and a port number;

A2, the IPV4 network host sending the first intercommunication message to an intercommunication functional unit through the IPV4 network, the intercommunication functional unit encapsulating the first intercommunication message into a second intercommunication message and sending the second intercommunication message to the new network host through the new network, wherein, a source address of the second intercommunication message is a new network address of the intercommunication functional unit, and a destination address of the second intercommunication message is a new network address of the new network host;

A3, a protocol stack of the new network host de-encapsulating the second intercommunication message into the first intercommunication message and then reporting the first intercommunication message to an upper-layer IPV4 application of the new network host; and A4, the upper-layer IPV4 application of the new network host processing the first intercommunication message;

or, the method comprises:

the new network host sending a message to the IPV4 network host, wherein, the step of the new network host sending a message to the IPV4 network host comprises:

B1, the upper-layer IPV4 application of the new network host sending a first intercommunication message to the protocol stack of the new network host, wherein, a source address of the first intercommunication message is a compatible format address of the new network host, and a destination address of the first intercommunication message is an IPV4 address of the IPV4 network;

B2, the protocol stack of the new network host encapsulating the first intercommunication message into a second intercommunication message, wherein, a source address of the second intercommunication message is a new network address of the new network host, and a destination address of the second intercommunication message is a new network address of the intercommunication functional unit;

B3, the host sending the second intercommunication message to the intercommunication functional unit through the new network, and the intercommunication functional unit de-encapsulating the second intercommunication message into the first intercommunication message; and B4, forwarding the first intercommunication message to the IPV4 network host through the IPV4 network, and the IPV4 network host processing the de-encapsulated first intercommunication message.

Furthermore, the intercommunication functional unit comprises an intercommunication gateway and an intercommunication mapping server, and before the step A1, the method further comprises:

the intercommunication mapping server distributing the compatible format address to the new network host according to a request of the new network host, and storing a corresponding relationship between the new network address of the new network host and the compatible format address, wherein, the compatible format address has been completely registered in a domain name server (DNS) system; the IPV4 network host inquiring in the DNS to obtain the compatible format address of the new network host.

Furthermore, the step A2 is:

a21, the IPV4 network host sending the first intercommunication message to the intercommunication gateway;

a22, the intercommunication gateway referring to the intercommunication mapping server to obtain the new network address of the new network host; and a23, the intercommunication gateway encapsulating the first intercommunication message into the second intercommunication message, and sending the second intercommunication message to the new network host, wherein, the source address of the first intercommunication message is the new network address of the intercommunication gateway.

Furthermore, the step A2 is:

a21, the IPV4 network host sending the first intercommunication message to the intercommunication gateway;

a22, the intercommunication gateway encapsulating the first intercommunication message into a transition intercommunication message and sending the transition intercommunication message to the intercommunication mapping server, wherein, a source address of the transition intercommunication message is the new network address of the intercommunication gateway, and a destination address of the transition intercommunication message is a routing address routing to the intercommunication mapping server; and a23, the intercommunication mapping server receiving the transition intercommunication message, inquiring the new network address of the new network host corresponding to the compatible format address, modifying a destination address of the transition intercommunication message to be the new network address of the new network host to form the second intercommunication message, and forwarding the second intercommunication message to the new network host.

Furthermore, the method further comprises:

the intercommunication gateway locally caching a corresponding relationship between the compatible format address of the new network host and the new network address of the new network.

Furthermore, if the intercommunication gateway has a function of caching the corresponding relationship between the compatible format address of the new network host and the new network address of the new network, after the step a21, the method further comprises: the intercommunication gateway firstly inquiring whether there is information of the compatible format address of the new network host in a local cache;

executing step a22 when no corresponding new network address is inquired.

Furthermore, the new network is an Internet Protocol Version 6 (IPV6) network or an identity/location separation architecture network, and the new network address refers to an IPV6 address of an identity identifier for indicating an identity.

In order to solve the above technical problem, the present invention further provides an intercommunication functional unit supporting a system for implementing intercommunication between an Internet Protocol Version 4 (IPV4) network and a new network, wherein the intercommunication functional unit is connected with an IPV4 network host via the IPV4 network, and the intercommunication functional unit is configured to:

receive the first intercommunication message sent by the IPV4 network host, encapsulate the first intercommunication message into a second intercommunication message and send the second intercommunication message, wherein, a source address and a destination address of the second intercommunication message sent by the intercommunication functional unit are a new network address of the intercommunication functional unit and a new network address of a new network host respectively; and receive the second intercommunication message sent by a network side of the new network, de-encapsulate the received second intercommunication message into the first intercommunication message and send the de-encapsulated first intercommunication message, wherein, a source address and a destination address of the received second intercommunication message sent by the network side of the new network are the new network address of the new network host and the new network address of the intercommunication functional unit respectively.

Furthermore, the intercommunication functional unit comprises an intercommunication gateway and an intercommunication mapping server that are connected with each other, wherein, the intercommunication mapping server is configured to distribute a compatible format address to the new network host according to a request of the new network host, and store a corresponding relationship between the new network address of the new network host and the compatible format address;

the intercommunication gateway is configured to:

locally cache the corresponding relationship;

receive the first intercommunication message sent by the IPV4 network host, and obtain the network address of the new network host from a local cache or the intercommunication mapping server according to the compatible format address, and encapsulate the first intercommunication message sent by the IPV4 network host into the second intercommunication message and send the encapsulated second intercommunication message;

the new network address of the intercommunication functional unit refers to a new network address of the intercommunication gateway.

Furthermore, the intercommunication functional unit comprises an intercommunication gateway and an intercommunication mapping server that are connected with each other, wherein, the intercommunication mapping server is configured to:

distribute the compatible format address to the new network host according to a request of the new network host, and store a corresponding relationship between the new network address of the new network host and the compatible format address;

receive a transition intercommunication message sent by the intercommunication gateway, inquire the new network address of the new network host corresponding to the compatible format address, modify a destination address of the transition intercommunication message to be the new network address of the new network host to form the second intercommunication message, and forward the second intercommunication message to the new network host;

the intercommunication gateway is configured to:

locally cache the corresponding relationship;

receive the first intercommunication message sent by the IPV4 network host, and inquire the new network address of the new network host in the local cache according to the compatible format address, and when the new network address is inquired out, encapsulate the first intercommunication message sent by the IPV4 network host into the second intercommunication message and send the second intercommunication message, wherein, a source address of the first intercommunication message is the new network address of the intercommunication gateway; otherwise, encapsulate the first intercommunication message into a transition intercommunication message and send the transition intercommunication message to the intercommunication mapping server, wherein, a source address of the transition intercommunication message is the new network address of the intercommunication gateway, and a destination of the transition intercommunication message is a routing address routing to the intercommunication mapping server.

In order to solve the above technical problem, the present invention further provides a system for implementing intercommunication between an Internet Protocol Version 4 (IPV4) network and a new network. The system comprises an IPV4 network host, the intercommunication functional unit described above, and a new network host, wherein, the IPV4 network host is located in the IPV4 network and has an IPV4 address, and the IPV4 network host is configured to:

send and receive a first intercommunication message through the IPV4 network, wherein, a source address and a destination address of the sent first intercommunication message are the IPV4 address of the IPV4 network host and the compatible format address of the new network host respectively, a source address and a destination address of the received first intercommunication message are the compatible format address of the new network host and the IPV4 address of the IPV4 network host respectively, and the compatible format address comprises an IPV4 format address and a port number;

the intercommunication functional unit is connected with the IPV4 network host through the IPV4 network, and the intercommunication functional unit is configured to:

receive the first intercommunication message sent by the IPV4 network host, encapsulate the first intercommunication message into a second intercommunication message and forward the second intercommunication message, wherein, a source address and a destination address of the second intercommunication message sent by the intercommunication functional unit are the new network address of the intercommunication functional unit, and the new network address of the new network host respectively; and receive the second intercommunication message sent by a network side of the new network, de-encapsulate the received intercommunication message into the first intercommunication message and send the de-encapsulated first intercommunication message, wherein, a source address and a destination address of the received second intercommunication message sent by the network side of the new network are the new network address of the new network host and the new network address of the intercommunication functional unit respectively;

the new network host is located in the new network, and has the new network address different from an IPV4 addressing format and at least on IPv4 compatible format address, and is connected with the intercommunication functional unit through the new network, and the new network host comprises a protocol stack and an upper-layer IPV4 application, wherein, the upper-layer IPV4 application does not support a new network coding format, and is configured to generate and process the first intercommunication message;

the protocol stack supports the new network addressing format, and is configured to:

encapsulate the first intercommunication message generated by the upper-layer IPV4 application into the second intercommunication message and send the second intercommunication message to the intercommunication functional unit; and receive the second intercommunication message sent by the intercommunication functional unit, de-encapsulate the second intercommunication message sent by the intercommunication functional unit into the first intercommunication message and send the first intercommunication message to the upper-layer IPV4 application.

Furthermore, the intercommunication functional unit comprises an intercommunication gateway and an intercommunication mapping server that are connected with each other, wherein, the intercommunication mapping server is configured to distribute a compatible format address to the new network host according to a request of the new network host, and store a corresponding relationship between the new network address of the new network host and the compatible format address;

the intercommunication gateway is configured to:

locally cache the corresponding relationship;

receive the first intercommunication message sent by the IPV4 network host, and obtain the new network address of the new network host from a local cache or the intercommunication mapping server according to the compatible format address, and encapsulate the first intercommunication message sent by the IPV4 network host into the second intercommunication message and send the encapsulated second intercommunication message;

the new network address of the intercommunication functional unit refers to a new network address of the intercommunication gateway.

Furthermore, the intercommunication functional unit comprises an intercommunication gateway and an intercommunication mapping server that are connected with each other, wherein, the intercommunication mapping server is configured to:

distribute the compatible format address to the new network host according to a request of the new network host, and store a corresponding relationship between the new network address of the new network host and the compatible format address;

receive a transition intercommunication message sent by the intercommunication gateway, inquire the new network address of the new network host corresponding to the compatible format address, modify a destination address of the transition intercommunication message to be the new network address of the new network host to form the second intercommunication message, and forward the second intercommunication message to the new network host;

the intercommunication gateway is configured to:

locally cache the corresponding relationship;

receive the first intercommunication message sent by the IPV4 network host, and inquire the new network address of the new network host in the local cache according to the compatible format address, and when the new network address is inquired, encapsulate the first intercommunication message sent by the IPV4 network host into the second intercommunication message and send the second intercommunication message, wherein, a source address of the first intercommunication message is the new network address of the intercommunication gateway; otherwise, encapsulate the first intercommunication message into a transition intercommunication message and send the transition intercommunication message to the intercommunication mapping server, wherein, a source address of the transition intercommunication message is the new network address of the intercommunication gateway, and a destination of the transition intercommunication message is a routing address routing to the intercommunication mapping server.

Furthermore, the system further comprises a domain name server connected with the IPV4 network host and the new network host, and the domain name server is configured to:

implement domain name registration according to registration requests of the IPV4 network host and the new network host, and return the IPV4 address of the IPV4 network host and the compatible format address of the new network host according to an inquiry request.

Furthermore, the new network is an Internet Protocol Version 6 (IPV6) network or an identity/location separation architecture network, and the new network address refers to an IPV6 address or an identity identifier for indicating an identity.

In order to solve the above technical problem, the present invention further provides a method for implementing intercommunication between a first network and a second network, wherein, the first and second networks adopt different addressing formats, and the method comprises:

a step of generating and transmitting an intercommunication message, which comprises:

a first node generating a first intercommunication message, and transmitting the first intercommunication message from the first node to a second node, wherein, a source address and a destination address of the first intercommunication message are a first network addressing format address of a first network host and a compatible format address of a second network host respectively, or the source address and destination address of the first intercommunication message are the compatible format address of the second network host and the first network addressing format address of the first network host respectively, and the compatible format address comprises the first network addressing format address and a port number;

a step of encapsulating and transmitting the intercommunication message, which comprises:

the second node encapsulating the received first intercommunication message into a second intercommunication message, and transmitting the encapsulated second intercommunication message from the second node to a third node, wherein, a source address and a destination address of the second intercommunication message are a second network addressing format address of an intercommunication functional unit and a second network addressing format address of the second network host respectively, or, the source address and destination address of the second intercommunication message are the second network addressing format address of the second network host and the second network addressing format address of the intercommunication functional unit respectively;

a step of de-encapsulating and transmitting the intercommunication message, which comprises:

the third node de-encapsulating the received second intercommunication message into the first intercommunication message, and transmitting the de-encapsulated first intercommunication message from the third node to a fourth node; and a step of processing and transmitting the intercommunication message, which comprises:

the fourth node processing the received first intercommunication message; wherein, from the first node to the fourth node are the first network host, the intercommunication functional unit, a protocol layer of the second network host, and an upper-layer application of the second network host in turn, or, from the first node to the fourth node are the upper-layer application of the second network, the protocol layer of the second network host, the intercommunication functional unit and the first network host in turn, so as to implementing intercommunication between the first network and the second network by the intercommunication functional unit.

Furthermore, the intercommunication functional unit comprises an intercommunication gateway and an intercommunication mapping server, before the step of generating and transmitting the intercommunication message, the method further comprises:

the intercommunication mapping server distributing the compatible format address to the second network host according to a request of the second network host, and storing a corresponding relationship between the second network addressing format address of the second network host and the compatible format address, wherein, the compatible format address of the second network host has been completely registered in a domain name server (DNS) system; and the first network host inquiring by the DNS to obtain the compatible format address of the second network host.

Furthermore, when the second node is the intercommunication functional unit, the intercommunication gateway locally caches the corresponding relationship;

in the step of encapsulating and transmitting the intercommunication message, after the intercommunication gateway receiving the first intercommunication message and before encapsulating the first intercommunication message into the second intercommunication message and sending the second intercommunication message, the step further comprises obtaining the network address of the new network host from a local cache or the intercommunication mapping server according to the compatible format address, the source address of the first intercommunication message is a second network address of the intercommunication gateway.

Furthermore, when the second node is the intercommunication functional unit, the intercommunication gateway locally caches the corresponding relationship;

in the step of encapsulating and transmitting the intercommunication message, after the intercommunication gateway receiving the first intercommunication message and before encapsulating the received first intercommunication message into the second intercommunication message, the step further comprises inquiring in a local cache according to the compatible format address;

in the step of encapsulating the received first intercommunication message into the second intercommunication message, the intercommunication gateway encapsulates the received first intercommunication message into the second intercommunication message when the new network address of the new network host is inquired; or when the new network address of the new network host is not inquired, the step further comprises:

the intercommunication gateway encapsulating the received first intercommunication message into a transition intercommunication message and sending the transition intercommunication message to the intercommunication mapping server, wherein, a source address of the transition intercommunication message is the second network addressing format address of the intercommunication gateway, and a destination address of the transition intercommunication message is a routing address routing to the intercommunication mapping server, and the intercommunication mapping server modifying the routing address to be the second network addressing format address of the corresponding second network host to form the second intercommunication message.

Furthermore, the first network is an Internet Protocol Version 4 (IPV4) network, and the first network addressing format address is an IPV4 address, the second network is an Internet Protocol Version 6 (IPV6) network or an identity/location separation architecture network, and the second network addressing format address is an IPV6 address or an identity identifier for indicating an identity.

The main conception of the method and system for implementing intercommunication according to the present invention is to adopt a mode of IPV4 address multiplexing and distribute a compatible format address to the new network host for intercommunicating with the IPV4 network, wherein the compatible format address comprises an IPV4 format address and a port number, this IPV4 address can be routed in the IPV4 network, thereby solving the problem of lack of IPV4 addresses and simultaneously implementing intercommunication; in addition, for a new network host, compatibility with the original IPV4 application program in the new network host can be achieved as long as the protocol stack of the new network host is upgraded.

PREFERRED EMBODIMENTS OF THE INVENTION

According to the present invention, a network using a new addressing format is called as a new network, its addressing format is different from that of the IPV4 network, and the new network may be an IPV6 network or an identity/location separation architecture network.

The main conception of the method and system for implementing intercommunication according to the present invention is to adopt a mode of IPV4 address multiplexing and distribute a compatible format address to the new network host for intercommunicating with the IPV4 network, wherein the compatible format address comprises an IPV4 format address and a port number, this IPV4 address can be routed in the IPV4 network, thereby solving the problem of lack of IPV4 addresses and simultaneously implementing intercommunication; in addition, for a net network host, compatibility with the original IPV4 application program in the new network host can be achieved as long as the protocol stack of the new network host is upgraded.

Figure 1:
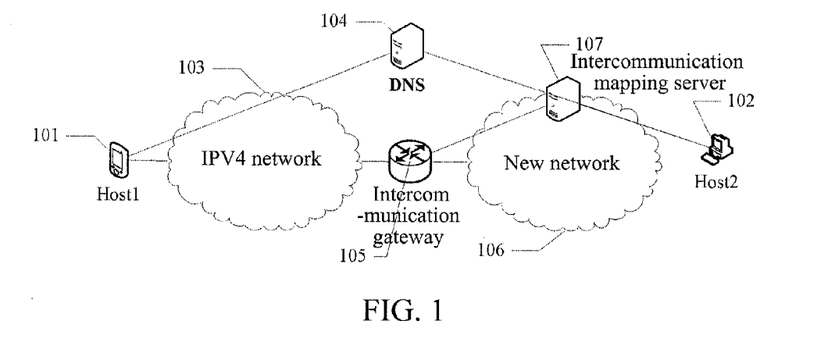
FIG. 1 illustrates the architecture of the system for implementing intercommunication between an IPV4 network and a new network according to the present invention.

The architecture of the system for implementing intercommunication between an IPV4 network and a new network according to the present invention is as shown in FIG. 1, wherein, 101 is an IPV4 network host Host1; 102 is a new network host Host2, for example, a host using IPV6 or LISP EID (Endpoint IDentifier) format addressing; 103 is an IPV4 network; 104 is a Domain Name Server (DNS); 105 is an intercommunication gateway for connecting the IPV4 network with the new network; 106 is a new network; 107 is an intercommunication mapping server for distributing the compatible format address of the new network host and addressing.

The new network host uses the new network format address distributed in a normal flow, and in addition, one or more addresses jointly identified with an IPV4 address+Port, which is called as a compatible format address, is also distributed to each application. This IPV4 address may be routed in the IPV4 network, and the routing is directed to the intercommunication gateway on the edge of the new network. Routing is always implemented using the addresses with the new network format in the new network. For each new network in the system, a small IPV4 public network address segment is distributed as an intercommunication address, which is then added with a port number of 16 bits to jointly serve as the compatible format address of the new network host. That is, the intercommunication address space is expanded by multiples of $2^{16}$, thereby solving the problem of lack of public network IP addresses. For example, a class B of IPV4 public network address (with a mask code 16 bits, and the number of available host IP addresses being $2^{16}$-1) is distributed to the whole new network, and with the addition of a port number, $2^{32}$-$2^{16}$ intercommunication hosts at most can be supported. In view of the fact that multiple IPV4 applications may be operated on one host and multiple port numbers may be occupied, the number of compatible hosts that are actually supported is smaller, but is still far larger than the number of IPV4 addresses that can be directly distributed to the new network.

When all the protocol stacks of the new network hosts are upgraded to support the new network addressing format, but the upper-layer application software does not support the new network addressing format, the TCP/IP protocol stack of the operation system adapts to the old application software that only supports the IPV4 address format. In the current operation system, all applications use Socket interfaces to implement invoking of IP communication function, so the protocol stack at the new network host side in the present invention needs to implement processing of compatibility of different address formats in the Socket interface layer. The protocol stack generally refers to a TCP/IP protocol software module of the operation system, including a Socket interface module.

It should be pointed out that if the IP addresses in the compatible format addresses are shared by multiple hosts, they can not participate in the common ARP (Address Resolution Protocol) process, otherwise, chaos will be caused.

The present invention will be further described in further detail below with reference to the drawings and specific embodiments.

Figure 2:
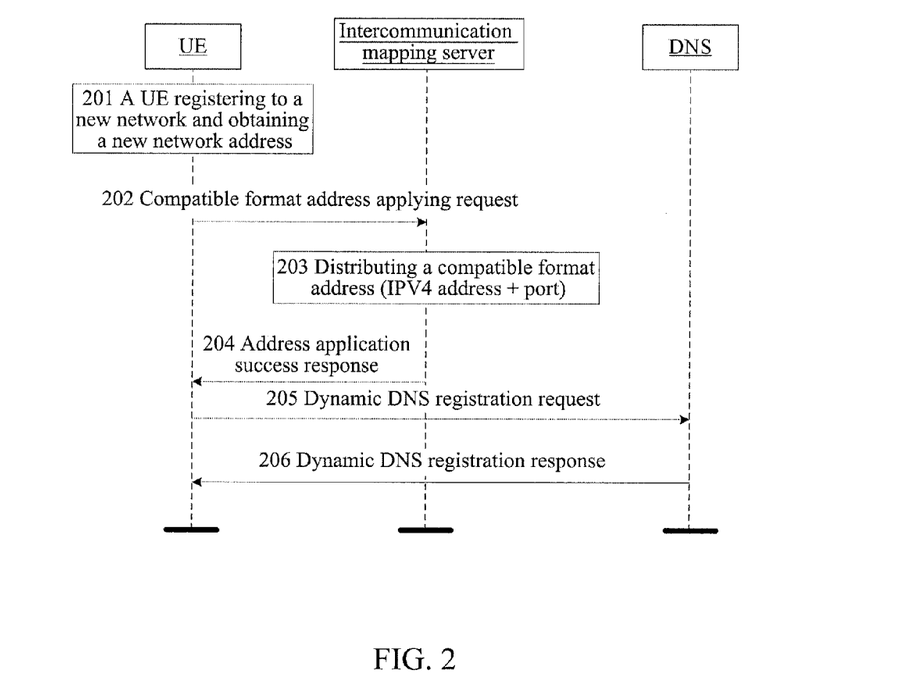
FIG. 2 is a flowchart of distributing a compatible format address of the new network according to the present invention.

FIG. 2 shows the flow of a new network host applying for a compatible format address according to the present invention, which comprises the following steps.

In step 201, the new network host registers in the new network according to the flow of the original network and obtains a new network address;

in step 202, the new network host protocol stack sends a compatible format address applying request at least carrying the new network address of the present host to an intercommunication mapping server;

in step 203, the intercommunication mapping server distributes a compatible format address, the format of which is an IPV4 public network address plus a port number, to the new network host, and records the corresponding relationship between the new network address of the new network host and the compatible format address;

in step 204, the intercommunication mapping server returns an address application success response to the new network host;

in step 205, the new network host registers its applied compatible format address to the DNS system using a dynamic DNS request by adopting the existing dynamic DNS regulations (see RFC2136); and in step 206, the DNS system returns a success response, and the flow ends.

In steps 205-206, the process of the new network host applying for registration to the DNS system may be also implemented in the following way: in step 205, the compatible format address applying request also carries the domain name of the new network host, and the intercommunication mapping server, in place of the new network host, registers its domain name and the compatible format address in the DNS system;

the new network host may also apply for the compatible format address to the intercommunication mapping server using the protocol stack when an upper-layer IPV4 application invokes a Socket interface for binding the local address.

Figure 3:
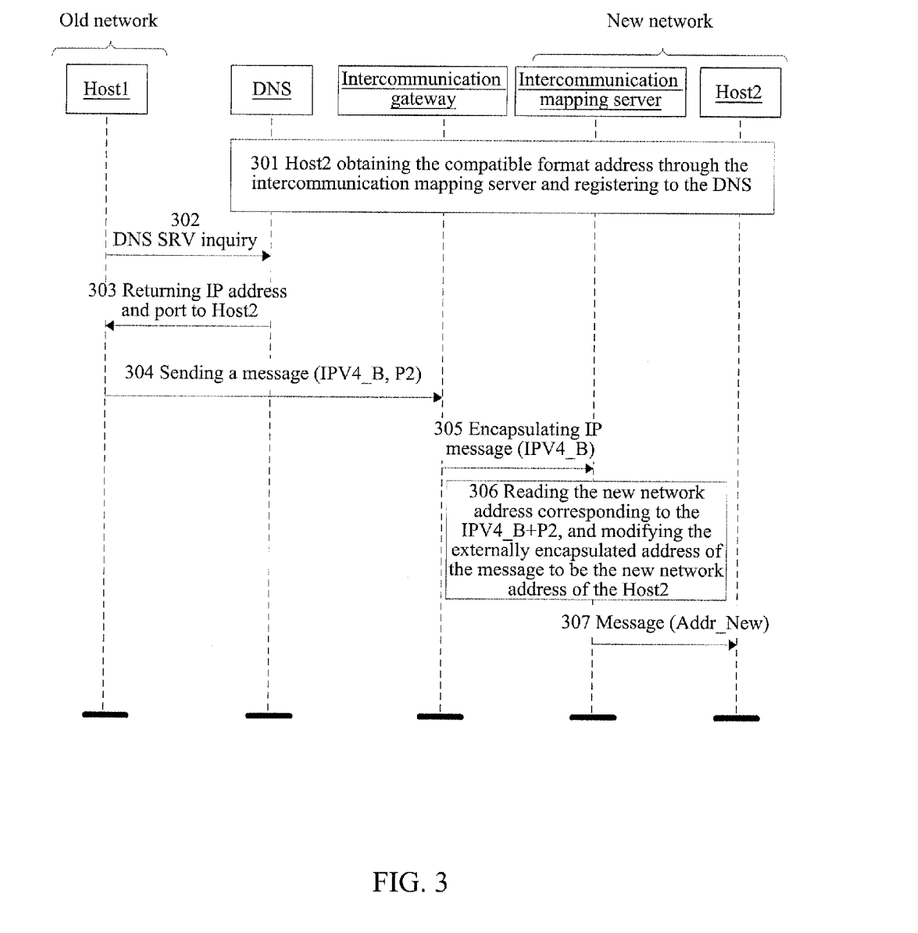
FIG. 3 is a flowchart of an IPV4 network host accessing a new network host according to the present invention.

FIG. 3 shows the implementation flowchart of an IPV4 network host accessing a new network host, which comprises the following steps.

In step 301, the IPV4 network host Host1 needs to establish communication with the new network host Host2, wherein the host Host2 has applied for its compatible IPV4 address and port number to the intercommunication mapping server by adopting the above flow, and has registered to DNS system;

in step 302, the host Host1 initiates DNS inquiry to inquire the address corresponding to the domain name of the host Host2, wherein the inquiry is implemented using DNS SRV (which is a type of DNS inquiry and recording, see RFC2782);

in step 303, the DNS system returns the IPV4 address IPV4_B and port number P2 registered by the host Host2;

in step 304, the host Host1 sends an IP message to the host Host2, and the source address of the IP message is IPV4_A, and its destination IP address and port number are IPV4_B and P2 respectively;

in step 305, the above message will reach an intercommunication gateway having an IPV4 addressing format address according to the routing rules, the intercommunication gateway encapsulates the message, the source address is the new network address of the intercommunication gateway, and the destination address is an entrance address of the intercommunication mapping server or a new network addressing format form of IPV4_B (both can be routed to the intercommunication mapping server, and may be collectively called as a routing address of the intercommunication mapping server);

since an IPV4 address+port number server as a compatible format address, and multiple hosts can share one IP address, this address cannot be directly routed in the IP layer, but has to be processed through the intercommunication mapping server and can only be routed after being transferred to its corresponding new network address.

If the new network is an IPV6 network, then the new network addressing format form of IPV4_B herein refers to the IPV6 form of the IPV4_B, since a fixed prefix has been distributed to the V6 format of the IPV4 address for intercommunication in the IPV6 protocol; if the new network is a network of an identity/location separation architecture, the same mode can be adopted, and a special prefix is distributed to the V4 address for intercommunication.

In step 306, after receiving the message, the intercommunication mapping server inquires of the database according to the destination address IPV4_B and the port number P2 to obtain the new network address registered by the host Host2;

in step 307, the intercommunication mapping server modifies the externally encapsulated destination address of the message to be the new network address of the host Host2, and then forwards it to the host Host2, and after the protocol stack of the host Host2 receives the message, it strips out the external encapsulation and reports the internal message (i.e., the IP message in step 304) to the upper-layer application for processing.

After the message is encapsulated by the intercommunication mapping server, the internal destination address is the compatible format address of the new network host (an IPV4 address+a port number), while the external destination address is the new network address of the new network host (for example an IPV6 address or an identity identifier of an identity/location separation architecture network). In a case where the new network is an identity/location separation architecture network, in order that the encapsulated message is forwarded to the new network host Host2, the message needs to be further encapsulated with the routing identifier of the new network host, and the format of the message is as follows:

load|IPV4 source address+source port number|IPV4 destination address+destination port number|source identity identifier|destination identity identifier|source routing identifier destination routing identifier.

The intercommunication mapping server can implement caching of the corresponding relationship in the following two modes:

mode one: in step 306, the intercommunication mapping server synchronously sends a message to the intercommunication gateway to inform it of the new network address corresponding to the compatible format address, and the intercommunication gateway caches the corresponding relationship;

mode two: after the intercommunication mapping server forwards the encapsulated message to the host Host2, the host Host2 sends to the source address (the new network address of the intercommunication gateway) a response message, based on which the intercommunication gateway caches the corresponding relationship of the host Host2.

In step 305, if the intercommunication gateway has the caching function of caching the corresponding relationship between the compatible format address of the host Host2 and the new network address, the intercommunication gateway can firstly search the local cache, and if information of the compatible format address of the host Host2 is not found, the intercommunication gateway encapsulates the message and then forwards to the intercommunication mapping server, otherwise, the message is directly encapsulated and forwarded to the host Host2.

Another way for forwarding the message is that in step 305, the intercommunication gateway does not directly forward the message, but inquires of the intercommunication mapping server the new network address corresponding to the compatible format address, obtains the result and records the result locally, and simultaneously encapsulates the message by using the new network address as the externally encapsulated destination address, directly forwards the encapsulated message to the host Host2 without the need of forwarding of the intercommunication mapping server.

Figure 4:
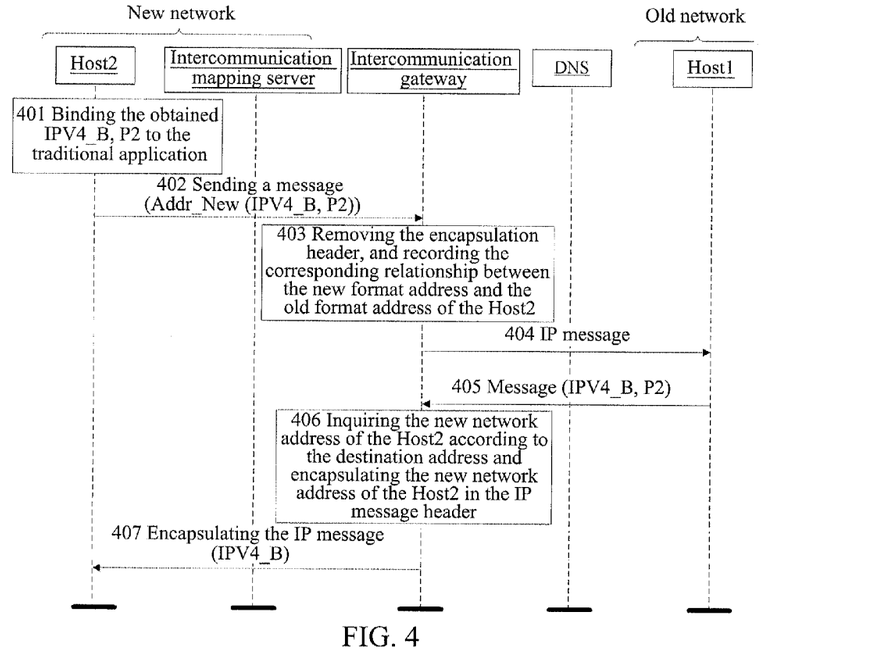
FIG. 4 is a flowchart of a new network host accessing an IPV4 network host according to the present invention.

FIG. 4 shows a flowchart of an example of a new network host accessing an IPV4 network host, which comprises the following steps.

In step 401, the host Host2 located in the new network has distributed a compatible format address IPV4_A, P1 through a registration flow;

in step 402, an address IPV4_B and a port number P2 have been bound to the upper-layer IPV4 application of the host Host2 in step 401, the upper-layer IPV4 application sends out a message, whose source address is IPV4_B, port number is P2, and destination address is IPV4_A, and the protocol stack encapsulates the message after receiving a message transmitting request, the encapsulated external source address is modified to be the new network address Addr_New of the host Host2, and the external destination address is the new network address of the intercommunication gateway or the new network addressing format form of IPV4_A;

in step 403, after receiving the message, the intercommunication gateway records a corresponding relationship between the source address, the new network address Addr_New of the message, and the compatible format address IPV4_B, P2 for use in the subsequent forwarding of subsequent messages;

in step 404, the intercommunication gateway strips out the external encapsulation of the IP message, restores the internal IPV4 message format, and forwards the message according to the destination address IPV4_A of the message;

in step 405, the host Host1 performs service processing after receiving the message, and returns an IP message (for example, if the last message is a TCP connection establishing request, then the host Host1 needs to response with a response message), whose destination address is IPV4_B, and port number is P2;

in step 406, the above IP message will reach the intercommunication gateway of the new network, and the intercommunication gateway can inquire the corresponding new network address Addr_New according to the destination IP address IPV4_B and port number P2, the intercommunication gateway encapsulates the received message, wherein the external source address is the new network address of the intercommunication gateway, and the destination address is the new network address Addr_new of the host Host2; and in step 407, the intercommunication gateway forwards the encapsulated message to the host Host1, the protocol stack of the host Host1 strips out the external encapsulation after receiving the message and submits the message with internal IPV4 format to the upper-layer application.

In specific implementation, the intercommunication gateway and the intercommunication mapping server can also be combined into one intercommunication functional unit, and the process (1) of the IPV4 network host sending a message to the new network host can be summarized as follows:

A1, the IPV4 network host sending a first intercommunication message, wherein, a source address of the first intercommunication message is an IPV4 address of the IPV4 network host, and a destination address of the first intercommunication message is a compatible format address of the new network host, and the compatible format address comprises an IPV4 format address and a port number;

A2, the IPV4 network host sending the first intercommunication message to an intercommunication functional unit through the IPV4 network, the intercommunication functional unit encapsulating the first intercommunication message into a second intercommunication message and forwarding the second intercommunication message to the new network host through the new network, wherein, a source address of the second intercommunication message is a new network address of the intercommunication functional unit, and a destination address of the second intercommunication message is a new network address of the new network host;

A3, a protocol stack of the new network host de-encapsulating the second intercommunication message into the first intercommunication message and then reporting the first intercommunication message to an upper-layer IPV4 application of the new network host; and A4, the upper-layer IPV4 application of the new network host processing the first intercommunication message.

The process (2) of the IPV4 network host sending a message to the new network host can be summarized as follows:

B1, the upper-layer IPV4 application of the new network host sending a first intercommunication message to the protocol stack of the new network host, wherein, a source address of the first intercommunication message is a compatible format address of the new network host, and a destination address of the first intercommunication message is an IPV4 address of the IPV4 network;

B2, the protocol stack of the new network host encapsulating the first intercommunication message into a second intercommunication message, wherein, a source address of the second intercommunication message is a new network address of the new network host, and a destination address of the second intercommunication message is a new network address of the intercommunication functional unit;

B3, the new network forwarding the second intercommunication message to the intercommunication functional unit, and the intercommunication functional unit de-encapsulating the second intercommunication message into the first intercommunication message; and B4, the IPV4 network forwarding the first intercommunication message to the IPV4 network host, and the IPV4 network host processing the first intercommunication message.

Figure 5:
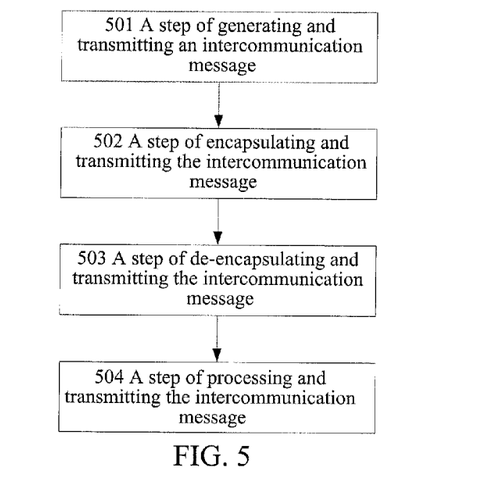
FIG. 5 is a flowchart of intercommunication between networks with different addressing formats according to the present invention.

It can be seen from the above summarized content that both process (1) and process (2) involve the process of encapsulating the first intercommunication message into the second intercommunication message and then de-encapsulating the second intercommunication message into the first intercommunication message. As shown in FIG. 5, the method for intercommunication between a first network and a second network with different addressing formats comprises the following steps:

step 501, a step of generating and transmitting an intercommunication message, which comprises: a first node generating a first intercommunication message, and transmitting the first intercommunication message from the first node to a second node, wherein, a source address and a destination address of the first intercommunication message are a first network addressing format address of a first network host or a compatible format address of a second network host, and the compatible format address comprises the first network addressing format address and a port number;

step 502, a step of encapsulating and transmitting the intercommunication message, which comprises: the second node encapsulating the received first intercommunication message into a second intercommunication message, and transmitting the encapsulated second intercommunication message from the second node to a third node, wherein, a source address and a destination address of the second intercommunication message are a second network addressing format address of an intercommunication functional unit or a second network addressing format address of the second network host;

step 503, a step of de-encapsulating and transmitting the intercommunication message, which comprises: the third node de-encapsulating the received second intercommunication message into the first intercommunication message, and transmitting the first intercommunication message between the third node and a fourth node; and step 504, a step of processing and transmitting the intercommunication message, which comprises: the fourth node processing the received first intercommunication message;

corresponding to the above process (1), from the first node to the fourth node are the first network host, the intercommunication functional unit, a protocol layer of the second network host, and an upper-layer application of the second network host in turn; corresponding to the above process (2), from the first node to the fourth node are the upper-layer application of the second network host, the protocol layer of the second network host, the intercommunication functional unit and the first network host in turn.

Figure 6:
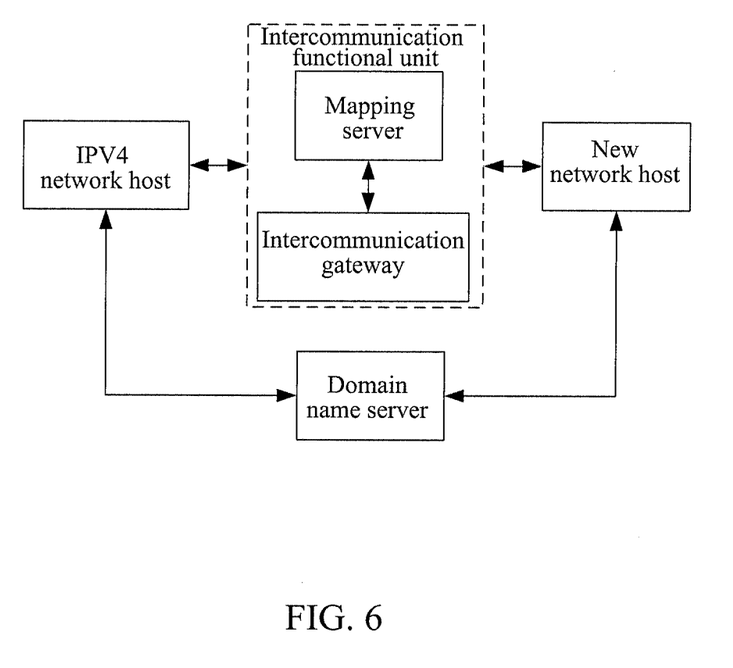
FIG. 6 illustrates the system for implementing intercommunication between an IPV4 network and a new network according to the present invention.

In order to implement the above method, the present invention further provides a system for implementing intercommunication between an Internet Protocol Version 4 (IPV4) network and a new network. The system comprises an IPV4 network host, an intercommunication functional unit, a new network host, and a domain name server connected with the IPV4 network host and the new network host, wherein, the IPV4 network host is located in the IPV4 network and has an IPV4 address, and the IPV4 network host is used to send and receive a first intercommunication message through the IPV4 network, wherein, a source address and a destination address of the first intercommunication message are the IPV4 address of the IPV4 network host or the compatible format address of the new network host, and the compatible format address comprises an IPV4 format address and a port number;

the intercommunication functional unit is connected with the IPV4 network host through the IPV4 network, has an IPV4 address and a new network address used for routing of messages in the two networks respectively, and the intercommunication functional unit is used to receive the first intercommunication message, encapsulate the first intercommunication message into a second intercommunication message and sending the second intercommunication message; it is also used to receive the second intercommunication message sent by a network side of the new network, de-encapsulate the second intercommunication message into the first intercommunication message and send the first intercommunication message, wherein, a source address and a destination address of the second intercommunication message are the new network address of the intercommunication functional unit or the new network address of the new network host.

Specifically, the intercommunication functional unit comprises an intercommunication gateway and an intercommunication mapping server that are connected with each other.

In order to implement first-message forwarding of the intercommunication gateway, the intercommunication mapping server and the intercommunication gateway have the following functions:

the intercommunication mapping server has a new network address and is used to distribute a compatible format address to the new network host according to a request of the new network host, and store a corresponding relationship between the new network address of the new network host and the compatible format address;

the intercommunication gateway has an IPV4 address and a new network address used for routing of messages in the two networks respectively, and the intercommunication gateway is used to locally cache the corresponding relationship; receive the first intercommunication message, and obtain the new network address of the new network host from a local cache or the intercommunication mapping server according to the compatible format address, and encapsulate the first intercommunication message into the second intercommunication message and send the second intercommunication message; the new network address of the intercommunication functional unit refers to a new network address of the intercommunication gateway.

In order to implement first-message forwarding of the intercommunication gateway, the intercommunication mapping server and the intercommunication gateway have the following functions:

the intercommunication mapping server has a new network address, and is used to distribute the compatible format address to the new network host according to a request of the new network host, and store a corresponding relationship between the new network address of the new network host and the compatible format address; it is also used to receive a transition intercommunication message sent by the intercommunication gateway, inquire the corresponding new network address, modify a destination address of the transition intercommunication message to be the new network address of the new network host to form the second intercommunication message, and forward the second intercommunication message to the new network host;

the intercommunication gateway has an IPV4 address and a new network address used for routing of messages in the two networks respectively, and the intercommunication gateway is used to locally cache the corresponding relationship; and is further used to receive the first intercommunication message, and inquire the new network address of the new network host in the local cache according to the compatible format address, and when the new network address is inquired, encapsulate the first intercommunication message into the second intercommunication message and send the second intercommunication message, wherein, a source address of the first intercommunication message is the new network address of the intercommunication gateway; otherwise, encapsulate the first intercommunication message into a transition intercommunication message and send the transition intercommunication message to the intercommunication mapping server, wherein, a source address of the transition intercommunication message is the new network address of the intercommunication gateway, and a destination address of the transition intercommunication message is a routing address routing to the intercommunication mapping server.

The new network host is located in the new network, and has the new network address different from an IPV4 addressing format and at least on IPv4 compatible format address, and is connected with the intercommunication functional unit through the new network, and the new network host comprises a protocol stack and an upper-layer IPV4 application, wherein, the upper-layer IPV4 application does not support a new network coding format, and is used to generate and process the first intercommunication message; the protocol stack supports the new network coding format, and is used to encapsulate the first intercommunication message generated by the upper-layer IPV4 application into the second intercommunication message and send the second intercommunication message; and receive the second intercommunication message, de-encapsulate the second intercommunication message into the first intercommunication message and send the first intercommunication message.

The domain name server is used to implement domain name registration according to registration requests of the IPV4 network host and the new network host, and return the IPV4 address of the IPV4 network host and the compatible format address of the new network host according to an inquiry request.

The new network in the present invention is an Internet Protocol Version 6 (IPV6) network or an identity/location separation architecture network or other networks adopting addressing formats different from the IPV4 addressing formats, and the new network address refers to an IPV6 address or an identity identifier for indicating an identity.

The main conception of the method and system for implementing intercommunication according to the present invention is to adopt a mode of IPV4 address multiplexing and distribute a compatible format address to the new network host for intercommunicating with the IPV4 network, wherein the compatible format address comprises an IPV4 format address and a port number, this IPV4 address can be routed in the IPV4 network, thereby solving the problem of lack of IPV4 addresses and simultaneously implementing intercommunication; in addition, for a net network host, compatibility with the original IPV4 application program in the new network host can be achieved as long as the protocol stack of the new network host is upgraded.

Industrial Applicability

The main conception of the method and system for implementing intercommunication according to the present invention is to adopt a mode of IPV4 address multiplexing and distribute a compatible format address to the new network host for intercommunicating with the IPV4 network, wherein the compatible format address comprises an IPV4 format address and a port number, this IPV4 address can be routed in the IPV4 network, thereby solving the problem of lack of IPV4 addresses and simultaneously implementing intercommunication; in addition, for a net network host, compatibility with the original IPV4 application program in the new network host can be achieved as long as the protocol stack of the new network host is upgraded.

What is claimed is:

1. A method for implementing intercommunication between an Internet Protocol Version 4 (IPV4) network and a new network, wherein, the new network adopts an addressing format different from that of the IPV4 network, and the method comprises:

a new network host sending a message to an IPV4 network host, wherein, the new network host has a compatible format address and a new network address, the step of the new network host sending a message to the IPV4 network host comprises:

B1, a upper-layer IPV4 application of the new network host sending a first intercommunication message to a protocol stack of the new network host, wherein, a source address of the first intercommunication message is the compatible format address of the new network host, and a destination address of the first intercommunication message is an IPV4address of the IPV4 network; wherein the compatible format address comprises an IPV4 format address and a port number;

B2, the protocol stack of the new network host encapsulating the first intercommunication message into a second intercommunication message, wherein, a source address of the second intercommunication message is the new network address of the new network host, and a destination address of the second intercommunication message is a new network address of an intercommunication functional unit;

B3, the host sending the second intercommunication message, which is forwarded to the intercommunication functional unit through the new network, and the intercommunication functional unit de-encapsulating the second intercommunication message into the first intercommunication message; and B4, forwarding the first intercommunication message to the IPV4 network host through the IPV4 network, and the IPV4 network host processing the de-encapsulated first intercommunication message.

2. The method according to claim 1, wherein, the method further comprising:

the IPV4 network host sending a message to the new network host, wherein, the step of the IPV4 network host sending a message to the new network host comprises:

A1, the IPV4 network host sending a first intercommunication message, wherein, a source address of the first intercommunication message is an IPV4 address of the IPV4 network host, and a destination address of the first intercommunication message is the compatible format address of the new network host;

A2, the IPV4 network host forwarding the first intercommunication message to the intercommunication functional unit through the IPV4 network, the intercommunication functional unit encapsulating the first intercommunication message into a second intercommunication message and forwarding the second intercommunication message to the new network host through the new network, wherein, a source address of the second intercommunication message is a new network address of the intercommunication functional unit, and a destination address of the second intercommunication message is the new network address of the new network host;

A3, the protocol stack of the new network host de-encapsulating the second intercommunication message into the first intercommunication message and then reporting the first intercommunication message to the upper-layer IPV4 application of the new network host; and A4, the upper-layer IPV4 application of the new network host processing the first intercommunication message.

3. The method according to claim 2, wherein, the intercommunication functional unit comprises an intercommunication gateway and an intercommunication mapping server, before the step A1, the method further comprises: the intercommunication mapping server distributing the compatible format address to the new network host according to a request from the new network host, and storing a corresponding relationship between the new network address of the new network host and the compatible format address, wherein, the compatible format address has been completely registered in a domain name server (DNS) system; the IPV4network host inquiring in the DNS to obtain the compatible format address of the new network host.

4. The method according to claim 3, wherein, the step A2 comprises:
- a21, the IPV4 network host sending the first intercommunication message to the intercommunication gateway;
- a22, the intercommunication gateway inquiring the intercommunication mapping server to obtain the new network address of the new network host; and
- a23, the intercommunication gateway encapsulating the first intercommunication message into the second intercommunication message, and sending the second intercommunication message to the new network host, wherein,
- the source address of the first intercommunication message is the new network address of the intercommunication gateway.

5. The method according to claim 3, wherein, the step A2 comprises:
- a21, the IPV4 network host sending the first intercommunication message to the intercommunication gateway;
- a22, the intercommunication gateway encapsulating the first intercommunication message into a transition intercommunication message and sending the transition intercommunication message to the intercommunication mapping server, wherein, a source address of the transition intercommunication message is the new network address of the intercommunication gateway, and a destination address of the transition intercommunication message is a routing address routing to the intercommunication mapping server; and
- a23, the intercommunication mapping server receiving the transition intercommunication message, inquiring the new network address of the new network host corresponding to the compatible format address, modifying the destination address of the transition intercommunication message to be the new network address of the new network host to form the second intercommunication message, and forwarding the second intercommunication message to the new network host.

6. The method according to claim 4, wherein, the method further comprises:
- the intercommunication gateway locally caching a corresponding relationship between the compatible format address of the new network host and the new network address of the new network.

7. The method according to claim 4, wherein, if the intercommunication gateway has a function of caching the corresponding relationship between the compatible format address of the new network host and the new network address of the new network, after the step a21, the method further comprises: the intercommunication gateway firstly inquiring whether there is information of the compatible format address of the new network host in a local cache;
- executing step a22 when no corresponding new network address is inquired.

8. The method according to claim 1, wherein, the new network is an Internet Protocol Version 6 (IPV6) network or an identity/location separation architecture network, and the new network address refers to an IPV6 address of an identity identifier for indicating an identity.

9. An intercommunication functional unit supporting a system for implementing intercommunication between an Internet Protocol Version 4 (IPV4) network and a new network, wherein the intercommunication functional unit is connected with an IPV4 network host via the IPV4 network,
wherein, the intercommunication functional unit comprises an intercommunication gateway and an intercommunication mapping server that are connected with each other, wherein,
the intercommunication mapping server is set to:
- distribute a compatible format address comprising an IPV4 format address and a port number to the new network host according to a request of the new network host, and store a corresponding relationship between a new network address and the compatible format address of the new network host; and
- receive a transition intercommunication message sent by the intercommunication gateway, inquire the new network address of the new network host corresponding to the compatible format address, modify a destination address of the transition intercommunication message to be the new network address of the new network host to form the second intercommunication message, and forward the second intercommunication message to the new network host;

the intercommunication gateway is set to:
- locally cache the corresponding relationship;
- receive the first intercommunication message sent by the IPV4 network host, and
- inquire the new network address of the new network host in the local cache according to the compatible format address, and when the new network address is found, encapsulate the first intercommunication message sent by the IPV4 network host into the second intercommunication message and send the second intercommunication message, wherein, a source address of the first intercommunication message is the new network address of the intercommunication gateway; otherwise, encapsulate the first intercommunication message into a transition intercommunication message and send the transition intercommunication message to the intercommunication mapping server, wherein, a source address of the transition intercommunication message is the new network address of the intercommunication gateway, and a destination of the transition intercommunication message is a routing address routing to the intercommunication mapping server.

10. A system for implementing intercommunication between an Internet Protocol Version 4 (IPV4) network and a new network, comprising an IPV4 network host, the intercommunication functional unit described in claim 9, and at least one new network host, wherein,
the IPV4 network host is located in the IPV4 network and has an IPV4 address, and the IPV4 network host is set to:
- send and receive a first intercommunication message through the IPV4 network, wherein, a source address and a destination address of the sent first intercommunication message are the IPV4 address of the IPV4 network host and the compatible format address of the new network host respectively, a source address and a destination address of the received first intercommunication message are the compatible format address of the new network host and the IPV4 address of the IPV4 network host respectively, and the compatible format address comprises an IPV4 format address and a port number;

the new network host is located in the new network, and has the new network address different from an IPV4 addressing format and at least one IPv4 compatible format address, and is connected with the intercommunication functional unit through the new network, and the new network host comprises a protocol stack and an upper-layer IPV4 application, wherein, the upper-layer IPV4 application does not support a new network addressing format, and is set to generate and process the first intercommunication message;

the protocol stack supports the new network addressing format, and is set to:
encapsulate the first intercommunication message generated by the upper-layer IPV4application into the second intercommunication message and send the second intercommunication message to the intercommunication functional unit; and receive the second intercommunication message sent by the intercommunication functional unit, de-encapsulate the second intercommunication message sent by the intercommunication functional unit into the first intercommunication message and send the first intercommunication message to the upper-layer IPV4 application.

11. The system according to claim 10, wherein, the system further comprises a domain name server connected with the IPV4 network host and the new network host, and the domain name server is set to:
implement domain name registration according to registration requests of the IPV4 network host and the new network host, and
return the IPV4 address of the IPV4 network host and the compatible format address of the new network host according to an inquiry request.

12. The system according to claim 10, wherein, the new network is an Internet Protocol Version 6 (IPV6) network or an identity/location separation architecture network, and the new network address refers to an IPV6 address or an identity identifier for indicating an identity.

13. A method for implementing intercommunication between a first network and a second network, wherein, the first network and the second network adopt different addressing formats, and the method comprises:
a step of generating and transmitting an intercommunication message, which comprises:
a first node generating a first intercommunication message, and transmitting the first intercommunication message from the first node to a second node, wherein, a source address and a destination address of the first intercommunication message are a first network addressing format address of a first network host and a compatible format address of a second network host respectively, or the source address and destination address of the first intercommunication message are the compatible format address of the second network host and the first network addressing format address of the first network host respectively, and the compatible format address comprises the first network addressing format address and a port number;
a step of encapsulating and transmitting the intercommunication message, which comprises:
the second node encapsulating the received first intercommunication message into a second intercommunication message, and transmitting the encapsulated second intercommunication message from the second node to a third node, wherein, a source address and a destination address of the second intercommunication message are a second network addressing format address of an intercommunication functional unit and a second network addressing format address of the second network host respectively, or, the source address and destination address of the second intercommunication message are the second network addressing format address of the second network host and the second network addressing format address of the intercommunication functional unit respectively;
a step of de-encapsulating and transmitting the intercommunication message, which comprises:
the third node de-encapsulating the received second intercommunication message into the first intercommunication message, and transmitting the de-encapsulated first intercommunication message from the third node to a fourth node; and
a step of processing and transmitting the intercommunication message, which comprises:
the fourth node processing the received first intercommunication message; wherein,
from the first node to the fourth node are the first network host, the intercommunication functional unit, a protocol layer of the second network host, and an upper-layer application of the second network host in turn, or,
from the first node to the fourth node are the upper-layer application of the second network host, the protocol layer of the second network host, the intercommunication functional unit and the first network host in turn,
so as to implementing intercommunication between the first network and the second network by the intercommunication functional unit.

14. The method according to claim 13, wherein,
the intercommunication functional unit comprises an intercommunication gateway and an intercommunication mapping server,
before the step of generating and transmitting the intercommunication message, the method further comprises:
the intercommunication mapping server distributing the compatible format address to the second network host according to a request of the second network host, and storing a corresponding relationship between the second network addressing format address of the second network host and the compatible format address, wherein, the compatible format address of the second network host has been completely registered in a domain name server (DNS) system;
the first network host inquiring the DNS to obtain the compatible format address of the second network host.

15. The method according to claim 14, wherein,
when the second node is the intercommunication functional unit, the intercommunication gateway locally caches the corresponding relationship;
in the step of encapsulating and transmitting the intercommunication message,
after the intercommunication gateway receives the first intercommunication message and before encapsulating the first intercommunication message into the second intercommunication message and sending the second intercommunication message, the step further comprises obtaining the network address of the new network host from a local cache or the intercommunication mapping server according to the compatible format address,
the source address of the first intercommunication message is a second network address of the intercommunication gateway.

16. The method according to claim 14, wherein,
when the second node is the intercommunication functional unit, the intercommunication gateway locally caches the corresponding relationship;
in the step of encapsulating and transmitting the intercommunication message, after the intercommunication gateway receives the first intercommunication message and before encapsulating the received first intercommunication message into the second intercommunication message, the step further comprises inquiring in a local cache according to the compatible format address;

in the step of encapsulating the received first intercommunication message into the second intercommunication message, the intercommunication gateway encapsulates the received first intercommunication message into the second intercommunication message when the new network address of the new network host is inquired; or when the new network address of the new network host is not inquired, the step further comprises:

the intercommunication gateway encapsulating the received first intercommunication message into a transition intercommunication message and sending the transition intercommunication message to the intercommunication mapping server, wherein, a source address of the transition intercommunication message is the second network addressing format address of the intercommunication gateway, and a destination address of the transition intercommunication message is a routing address routing to the intercommunication mapping server, and the intercommunication mapping server modifying the routing address to be the second network addressing format address of the corresponding second network host to form the second intercommunication message.

17. The method according to claim 13, wherein, the first network is an Internet Protocol Version 4 (IPV4) network, and the first network addressing format address is an IPV4 address, the second network is an Internet Protocol Version 6 (IPV6) network or an identity/location separation architecture network, and the second network addressing format address is an IPV6 address or an identity identifier for indicating an identity.

18. The method according to claim 5, wherein, the method further comprises:
 the intercommunication gateway locally caching a corresponding relationship between the compatible format address of the new network host and the new network address of the new network.

19. The method according to claim 5, wherein, if the intercommunication gateway has a function of caching the corresponding relationship between the compatible format address of the new network host and the new network address of the new network, after the step a21, the method further comprises: the intercommunication gateway firstly inquiring whether there is information of the compatible format address of the new network host in a local cache;
 executing step a22 when no corresponding new network address is inquired.

* * * * *